Figures 1, 2:
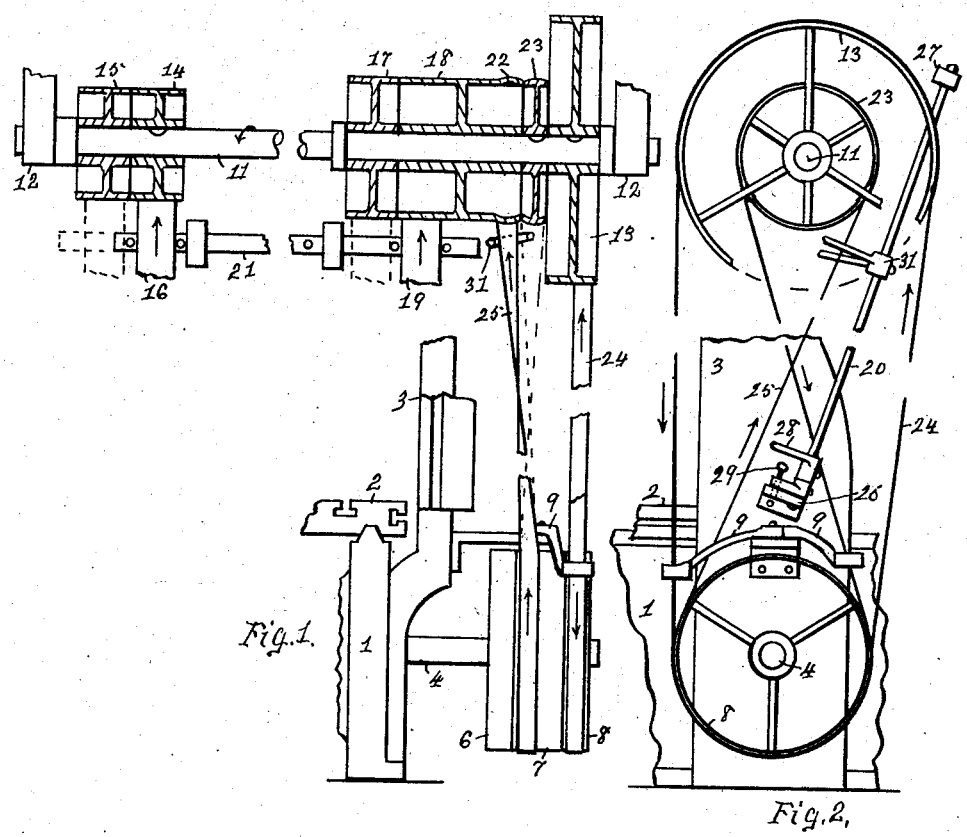

C. MEIER & G. LANGEN.
BELT GEARING.
APPLICATION FILED APR. 21, 1909.

973,801.

Patented Oct. 25, 1910.

Witnesses,
A. Wespiser
P. A. Carr

Inventors,
Charles Meier, and
George Langen,
By Robert S. Carr, Atty.

UNITED STATES PATENT OFFICE.

CHARLES MEIER AND GEORGE LANGEN, OF CINCINNATI, OHIO, ASSIGNORS TO THE CINCINNATI PLANER COMPANY, OF CINCINNATI, OHIO, A CORPORATION OF OHIO.

BELT-GEARING.

973,801.  Specification of Letters Patent.  Patented Oct. 25, 1910.

Application filed April 21, 1909. Serial No. 491,373.

To all whom it may concern:

Be it known that we, CHARLES MEIER and GEORGE LANGEN, citizens of the United States, residing at Cincinnati, Ohio, have invented new and useful Improvements in Belt-Gearing, of which the following is a specification.

Our invention relates to belt gearing, and the objects of our improvements are to provide the counter shaft with two pulleys driven at different speeds; to provide a shifter for moving and maintaining the planer driving belt on either of said pulleys, and to construct and assemble the various parts for securing facility of operation and efficiency of action. These objects are attained in the following described manner as illustrated in the accompanying drawings, in which:

Figure 1 is a front elevation with parts in section of a belt gearing embodying our improvements; Fig. 2, an end elevation with parts broken away.

In the drawings, 1 represents the bed of a metal working planer, 2 the table, 3 the housing, 4 the driving shaft provided with the driving pulley 6, idle pulley 7, and reversing pulley 8, 9 the belt shifting mechanism, all being constructed and arranged in the ordinary manner.

The counter shaft 11 journaled in fixed bearings 12 is provided with a reversing pulley 13 and with the usual tight and loose pulleys 14 and 15 for the belt 16 which drives the counter shaft at a predetermined speed (from a source not shown). Said counter shaft is also provided with narrow and wide loose pulleys 17 and 18 for the belt 19, for driving (from a source not shown) said pulleys at a different speed than that of the counter shaft. A shifter 21 serves to shift belts 16 and 19 simultaneously, as shown by dotted lines in Fig. 1. Pulley 18 is formed on one end with a narrow crowned face 22 and a narrow crown faced pulley 23 of the same diameter therewith is secured on the counter shaft adjacent to and between said crowned portion of the pulley 18 and the larger reversing pulley 13. The usual straight belt 24 on pulley 13 communicates with the reversing pulley 8 on the driving shaft, and the usual crossed belt 25 drives pulley 6 at a predetermined speed from the crowned portion 22 of the pulley 18. A rod 20 journaled in fixed bearings 26 and 27 is provided with a handle 28, a locking pin 29 and with a shifting finger 31 for belt 25, whereby said belt may be shifted onto either the pulley 23 or the crowned portion 22 of pulley 18 as desired, and there maintained by means of the said locking pin.

In operation, pulley 23 being driven with the counter shaft and pulley 18 being driven at a different speed, the shifting of the driving belt from the one to the other of said pulleys will cause it to drive the planer at correspondingly different speeds. The driving and reversing belts may be automatically shifted by means of the usual shifting mechanism 9 between the corresponding tight and loose pulleys on the driving shaft 4 in the usual manner. The usual distance between the driving shaft 4 and the counter shaft 11 requires a driving belt of such length that it will tend to remain on either the crowned pulley 23 or on the adjacent portion of pulley 18 without the assistance of the shifting finger 31.

Having fully described our improvements, what we claim as our invention and desire to secure by Letters Patent of the United States is:

1. The combination of a driven shaft, a counter shaft, a tight and a loose pulley mounted on each of said shafts, a belt extending between the respective tight pulleys, separate means for shifting the belt onto the respective loose pulleys, and separate means for driving the pulleys on the countershaft at respective different speeds.

2. A belt gearing comprising a driven shaft, a tight and a loose pulley thereon, a counter shaft, two pulleys thereon having adjacent portions of their faces crowned, separate belt connections for driving said crowned pulleys at respective different speeds, a belt engaging with one of the crowned pulleys, means for shifting the belt onto the other crowned pulley and means for shifting the belt onto the loose pulley.

CHARLES MEIER.
GEO. LANGEN.

Witnesses:
ED. F. ALEXANDER,
R. W. TAYLOR.